Jan. 30, 1934.         J. M. PALMER         1,945,292
TOOL HOLDER
Filed Sept. 23, 1931         2 Sheets-Sheet 2
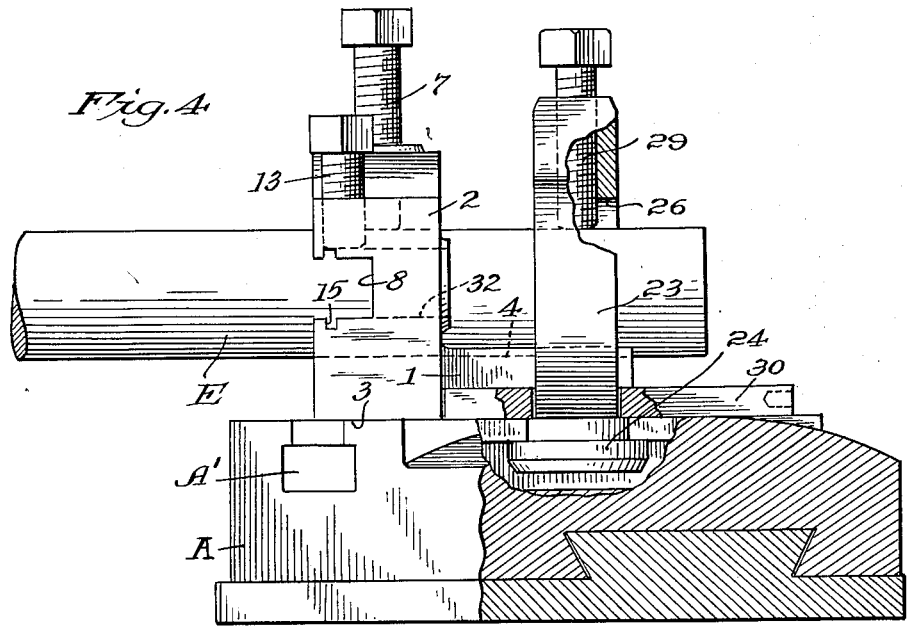
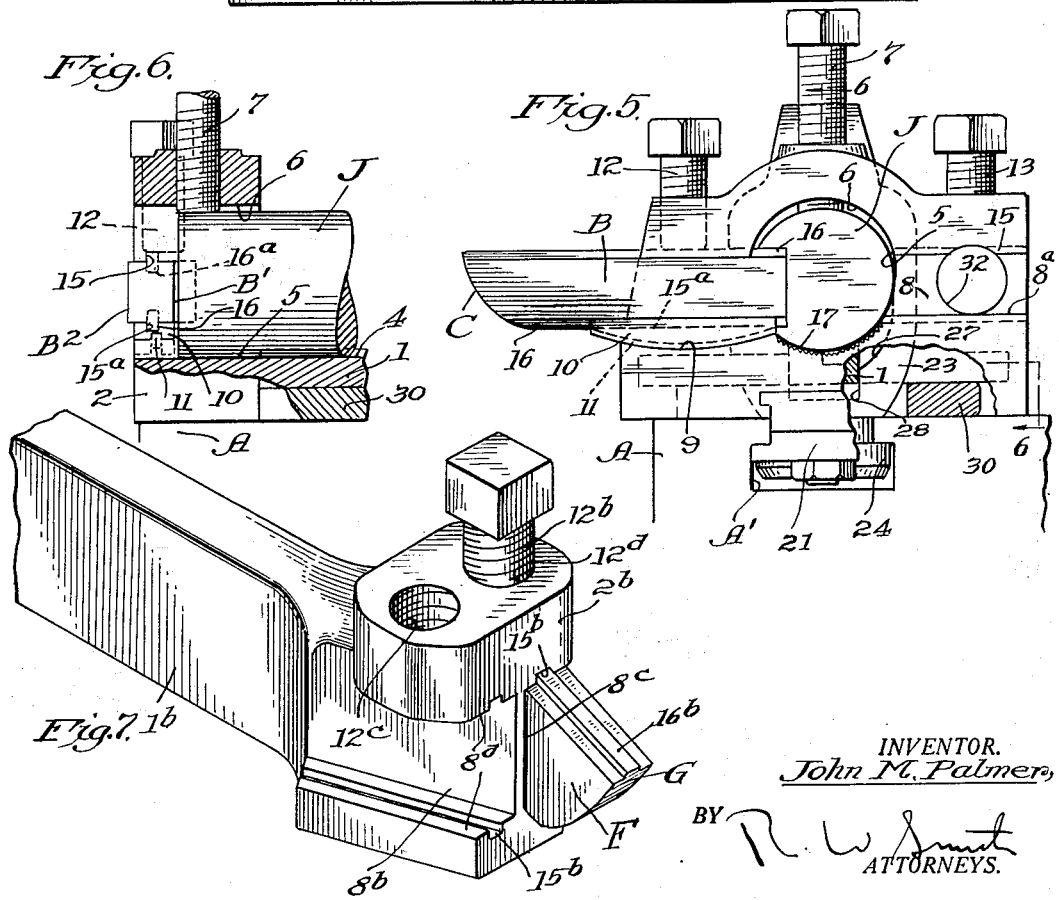
INVENTOR.
John M. Palmer,
BY 
ATTORNEYS.

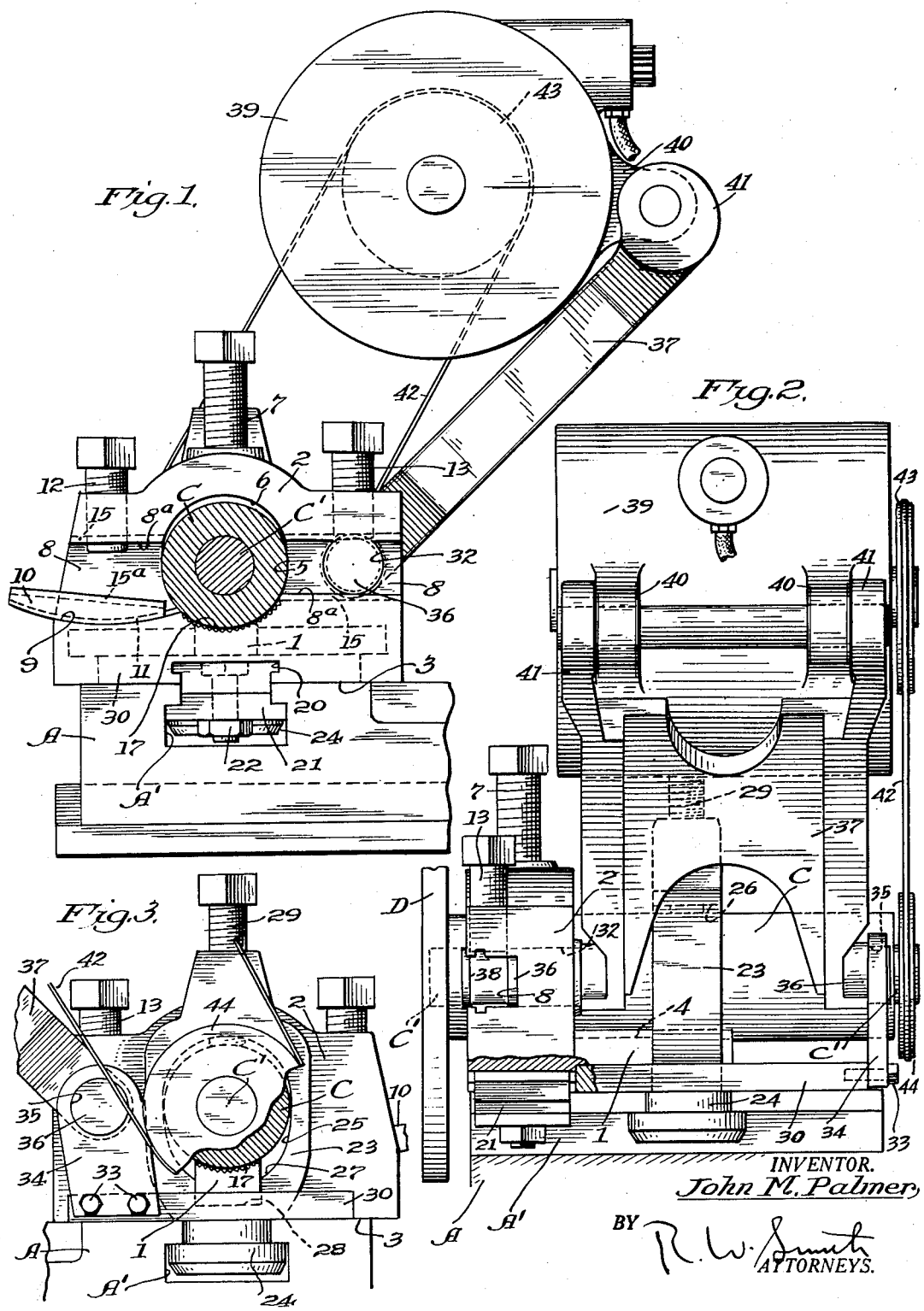

Patented Jan. 30, 1934

1,945,292

UNITED STATES PATENT OFFICE 1,945,292

TOOL HOLDER

John M. Palmer, Los Angeles, Calif.

Application September 23, 1931
Serial No. 564,566

11 Claims. (Cl. 82—36)

This invention is a holder for the various tools which are used in metal working machinery such as lathes, shapers, etc., and has for its object to provide a universal holder adapted to selectively mount various tools such as turning tools, cutting-off tools, boring tools, drills, reamers, grinders, etc.

More particularly it is an object of the invention to provide a tool holder adapted to receive the shank of a tool in a recess which is open at one side so as to accommodate tool shanks of different width, with a groove in the recess adapted to engage a cooperating rib of the tool shank so as to rigidly secure the tool shank against displacement in the direction of the open side of the recess, and the ribs being so positioned on the tool shanks, irrespective of their varying width, as to fix the tool shank in the recess with more or less of the width of the varying tool shanks projecting laterally outwardly through the open side of the recess.

It is a further object of the invention to provide the tool holder with a plurality of the aforementioned open-sided recesses adapted to selectively receive the shank of a tool, with the said recesses angularly disposed with relation to the shank of the tool holder so as to selectively mount right and left hand tools and also provide for varying the angular disposition of the tool holder with relation to the compound rest of a lathe or the like, while at the same time properly positioning the selected tool with relation to the work.

It is a still further object of the invention to positively secure the tool holder against turning with relation to a compound rest or the like while at the same time operatively positioning the tool which is mounted in the holder, and with the tool holder when positively held against turning having its length extending in the direction of the transverse tool-post receiving slot of the compound rest, but also adapted for mounting on the compound rest so as to permit angular adjustment of its length with relation to the direction of said transverse slot.

It is a still further object of the invention to adapt the tool holder for support of such auxiliaries as may form a part of certain tools for which it is desired to provide a mounting in order that the device may be a true universal holder.

Further objects of the invention will be readily understood from the following description of the accompanying drawings, in which:

Fig. 1 is a front elevation of one embodiment of the invention, showing the tool which is mounted therein as a grinding disc.

Fig. 2 is a side elevation of the same construction.

Fig. 3 is a rear elevation thereof.

Fig. 4 is a side elevation of the tool holder showing a different method of mounting the same and showing a different type of tool mounted therein.

Fig. 5 is a front elevation of the tool holder showing the method of mounting a still different type of tool.

Fig. 6 is a detail section on the line 6—6 of Fig. 5.

Fig. 7 is a perspective view showing a modified construction of the tool holder.

The embodiment of the invention illustrated in Figs. 1 to 6 provides a universal tool holder adapted to be positively held in operative position as is particularly advantageous for certain classes of work, or adapted to be simply frictionally clamped in operative position so as to permit of its ready angular adjustment as is desirable for other classes of work.

The holder comprises a shank 1 terminating in a right-angular transverse head 2, with the bottom of the head forming a flat bearing surface 3 of appreciable area adapted to rest upon a supporting surface such as the top A of the usual compound rest of a lathe. The shank 1 projects rearwardly from head 2 adjacent but in spaced relation from its bottom bearing surface 3, and has an upper surface 4 which throughout the length of the shank comprises an arc of a circumferential bore 5 of appreciable radius which opens through the head 2. The upper portion of bore 5 is preferably distorted as shown at 6 so as to extend beyond the true circumference of the bore, and a set screw 7 is threaded through the head 2 for projection into the bore at its distorted portion 6.

A transverse recess 8 is formed in the front face of head 2 so that the recess is open at that side which is at the front of head 2, and the recess is preferably in transverse alinement with the center of bore 5. The base of one end of the recess is preferably arcuately cut-away as shown at 9 so as to receive a cooperating rocker 10 which may be guided in its arcuate sliding movement by a cooperating tongue and groove 11; and the shank of a tool is adapted for mounting in recess 8, with the blade of the tool projecting beyond either side of the tool holder, and the tool shank either extending the length of the recess and thus supported at both ends of the recess, or simply mounted in one end or the other of the recess, with the tool shank adjustable on rocker 10 when mounted in that end of the recess which carries the rocker. The tool shank is adapted to fairly snugly fit between the walls 8ª of recess 8 which define its open side; and the tool shank is fixed against displacement lengthwise of the recess by set screws 12—13 threaded through the head 2 and into the recess adjacent its respective ends, so that one or both of the set screws may engage the tool shank depending upon whether it extends the full length or is only mounted in one end of the recess.

Fig. 5 shows a tool thus mounted in recess 8, the illustration showing the shank B of the tool mounted on rocker 10 and held in place by setscrew 12, with the blade C of the tool projecting beyond one side of head 2. The type of tool is immaterial, it being understood that a wide variety of tools may be formed with similar shanks B adapted for interchangeable mounting in recess 8.

Means are provided for preventing displacement of tool shank B through the open side of recess 8, while at the same time adapting the recess for reception of tool shanks of varying width, with the excess width of the wider shanks simply projecting outwardly through the open side of the recess as shown in Fig. 6. For this purpose at least one and preferably both the walls 8ª of the recess are grooved as shown at 15, with the grooves extending the length of the recess and an alined groove 15ª being formed in rocker 10.

The various tool shanks B which are adapted for reception in recess 8 are ribbed as shown at 16 for engaging grooves 15—15ª, and while these ribs may be detachable splines adapted for reception in grooves 16ª in the tool shanks as shown by broken lines in Fig. 6, it is preferable to form the ribs integral with the tool shanks as shown by full lines in Fig. 6. In either event the ribs 16 preferably extend the full length of the tool shanks; and irrespective of the width of the tool shanks the ribs have the same transverse spacing from the inner faces B¹ of the shanks so as to adapt the shanks for snug lateral reception in recess 8 as shown in Fig. 6, while the ribs may be transversely spaced any distance from the outer faces B² of the shanks depending upon the varying width of the shanks, so as to adapt a shank of any width for mounting in recess 8 with its ribs 16 readily alining with the cooperating grooves 15—15ª, and any excess width of the shank simply projecting outwardly through the open side of recess 8.

The tool holder is also adapted to support a tool shank with the latter extending lengthwise of the shank 1 of the tool holder, such use of the holder being illustrated in Figs. 1 to 3 with the quill C of a grinding disc D extending through bore 5 and supported on the arcuate surface 4 of shank 1 and clamped in place by set screw 7, and similar use of the tool holder being illustrated in Fig. 4 wherein the shank E of a boring bar projects from bore 5 and is clamped in place in the same manner.

Means are preferably provided for preventing lateral or rotary displacement of the shank of a tool when thus clamped in position projecting outwardly through bore 5, and for this purpose the arcuate surface 4 and the bore 5 may be provided with serrations 17 extending lengthwise of shank 1 and adapted to grip the shank of any tool clamped thereon. It will thus be seen that irrespective of the mounting of a tool shank in recess 8 or in bore 5, the shank is held against longitudinal displacement by the appropriate set screw 7, 12 or 13, and is held against lateral displacement by either the cooperating groove and rib 15—16 or the serrations 17, while at the same time adapting both the recess 8 and the bore 5 for reception of tool shanks which may be of appreciably varying width.

The tool holder as thus described may be positively held against angular adjustment with relation to its support, shown in the present instance as the top A of the compound rest of a lathe, or the tool holder may be adapted for angular adjustment for desired positioning of any particular tool which is mounted in the holder. It is desirable to positively secure the tool holder when a tool such as a long or heavy boring bar or grinding quill is mounted in bore 5 for projection longitudinally of the bed of the lathe; and the mounting is therefore so arranged as to positively secure the tool holder with relation to top A, when the head 2 extends transversely of the slot A¹ in the top of the compound rest and the shank 1 extends lengthwise of said slot as shown in Fig. 2.

As an instance of this arrangement and as shown in Figs. 1 and 2, slot 20 extends across the bearing surface 3 of the head 2 in the direction of shank 1, and a two-part shouldered clamping block 21 is adapted for reception of its respective parts in the slot 20 and in the transverse shouldered slot A¹ in the top of the compound rest of the lathe, so that by tightening a nut 22 the block 21 may clamp the tool holder on the top of the compound rest with the shank 1 extending in the direction of slot A¹.

As shown in Figs. 2 and 3, a post 23 is then mounted in the slot A¹ in back of head 2, preferably by providing the post with a shouldered swivel base 24 adapted to engage shouldered slot A¹ as in a usual lathe tool-post; and the post 23 has a bore 25 adapted to aline with bore 5, but preferably distorted at both its upper and lower portions as shown at 26 and 27 so as to extend appreciably beyond a true circumferential bore. The lower distortion 27 is recessed at 28 for reception of the shank 1 of the tool holder, and a set screw 29 is threaded through the post and into the upper distortion 26, so that with the parts assembled as shown in Fig. 2, and with the shank of whatever tool is mounted in bore 5 projecting rearwardly along surface 4 and thence through the bore 25 of post 23, and with a U-block 30 preferably straddling post 23 and resting upon the top of the compound rest and supporting the shank 1, tightening the set screw 29 is adapted to clamp the post 23 with relation to slot A¹ and at the same time clamp the shank of the tool in the fixed post.

The tool holder is thus held at two points spaced along slot A¹, i. e. at block 21 and at post 23, and is thus positively held against turning on the top of the compound rest; and the shank of the tool is similarly clamped at the spaced set screws 7 and 29, so that even a long or heavy tool shank may be projected from bore 5 with said shank positively held at the desired alinement parallel to slot A¹.

If on the other hand it is desired to mount the tool holder so that it may be swung to an angle with relation to slot A¹, as for example when boring a tapering hole, the clamping block 21 is removed, and as shown in Fig. 4 the tool holder is clamped in place at any desired angular adjustment with relation to slot $A^1$, simply by tightening the set screw 29 against the shank of the tool which is supported on surface 4 and which projects through the bores 5 and 25 as previously described. The head 2 is thus clamped against the top of the compound rest, and its shank 1 is clamped against block 30 which is in turn clamped against the compound rest; and the tool holder may thus be readily frictionally clamped at any desired angular adjustment.

When the tool holder supports a tool with the latter mounted in recess 8 as shown in Fig. 5, the tool holder may be fixed on the compound rest in various ways, e. g. by simply tightening the clamping block 21, or as previously described by employing either the spaced block and post 21—23 or merely using the post 23. At Fig. 5 I have shown a mounting embodying both block 21 and post 23, for which purpose a suitable auxiliary shank J is mounted in bores 5 and 25 and the tool holder is then clamped on the compound rest as previously described in connection with Figs. 1 to 3, with the tool B separately clamped in its recess 8 as previously described. On the other hand with the tool B mounted as shown in Fig. 5, the tool holder may be clamped on the compound rest by removing block 21 and simply tightening set screw 29 against the auxiliary shank J, which construction is not illustrated but which willl be understood by reference to the previous explanation of Fig. 4. In similar manner auxiliary shank J, post 23 and block 30 may be removed and the tool holder simply clamped in place by block 21, as will be readily understood without specific illustration.

When the quill C of a grinding disc D is mounted in the tool holder as shown in Figs. 1 to 3, the tool holder preferably also provides a mounting for the rotary drive mechanism for the grinding disc. For this purpose a bore 32 may open through head 2 parallel to bore 5 and in such position that set screw 13 opens into said bore, and the rear end surface of U-block 30 may be tapped for screws 33 which are adapted to support a lug 34 so that a bore 35 in said lug alines with bore 32.

The bores 32—35 form bearings for trunnions 36 of a bracket 37, whereby the bracket may be angularly supported as shown in Figs. 1 to 3, with the set screw 13 adapted to engage a groove 38 in the trunnion which is journaled in bearing 32, so as to lock the bracket 37 in desired adjusted position. The bracket supports rotary drive mechanism, shown in the present instance as an electric motor 39 having ears 40 whereby it may be fixed to cooperating lugs 41 at the swinging edge of the bracket; and the driving connection between motor 39 and the rotating shaft $C^1$ of the quill C is shown as a belt drive 42 engaging pulleys 43—44 on the motor shaft 45 and on quill shaft $C^1$ respectively.

At Fig. 7 I have shown a modification wherein the tool holder is of simpler construction, and is adapted for mounting in a usual tool post or in the bore 5 of a tool holder such as previously described. In this case the shank $1^b$ of the tool holder is of usual construction adapting it for reception in the usual slot of a tool post, and a transverse head $2^b$ at the end of the shank has recesses $8^b$ and $8^c$, each angularly disposed with relation to the shank of the tool holder, and also angularly disposed with relation to one another, so as to adapt the recesses for reception of a right-hand and left-hand tool respectively. The recesses $8^b$—$8^c$ are arranged as previously described, i. e. they are open at one side for reception of tool shanks of different width, and their walls $8^d$ which define their open sides are grooved as shown at $15^b$, with said grooves extending the length of the recesses and adapted to receive ribs $16^b$ on the shanks of the various tools which are adapted for selective mounting in the recesses.

I have shown a tool F mounted in one of the recesses $8^b$—$8^c$, the said tool comprising a usual straight shank terminating in a cutting edge G; but it will be obvious that various types of tools may be interchangeably employed as long as the shanks of the tools are adapted for reception in one of the recesses. For example the shank of the tool might be provided with any suitable socket (not shown), adapted for reception of a boring bar, drill, die or the like. Irrespective of the type of tool, its shank is mounted in one of the recesses $8^b$—$8^c$ with its rib $16^b$ positioned as previously described so as to aline with groove $15^b$ irrespective of the width of the tool shank and with any excess width of the shank projecting outwardly through the open side of the recess; and the tool shank is secured in its cooperating recess by a set screw $12^b$ adapted for selective threaded reception in either a bore $12^c$ or $12^d$ which open through head $2^b$ into the respective recesses.

The invention thus provides for mounting any desired tool in a cooperating recess in a tool holder, with the recess open at its ends so as to receive a tool having a shank of any length and with a cooperating rib and groove preventing lateral displacement of the tool while permitting use of tools having shanks of different width, with the excess width of the wider shanks simply projecting laterally outwardly through the open side of the cooperating recess. The invention also provides for angularly positioning the tool shank receiving recess of a tool holder with relation to the shank of the holder so as to adapt the tool holder for support with the shank of the tool projecting at such angle as will adapt the tool for various operations; and with the tool shank receiving recess particularly adapted to extend transversely to the length of the shank of the tool holder so that the tool holder may be positively held against movement in the direction of the length of the recess. The invention also provides an extremely practical mounting for a tool holder whereby long or heavy tools may be rigidly supported thereby, while at the same time adapting the tool holder for adjustment and reception of various types of tools so as to form a universal holder.

I claim:

1. In combination, a tool holder having a recess open at one side, a tool having a shank adapted for reception in the recess, a groove in at least one of the walls of the recess which define its open side, and a rib so positioned on the tool shank that irrespective of the width of the shank the rib is adapted for reception in the groove with the inner surface of the shank adjacent the inner wall of the recess and the width of the shank projecting laterally outwardly through the open side of the recess.

2. A tool holder comprising a shank and a transverse head, a recess extending across the front face of the head and open at its outer side, the recess being adapted for reception of the shank of a tool, means for securing a tool shank in the recess, the head having a bore with its axis extending in the direction of the shank of the tool holder, said tool holder shank forming a supporting surface in alinement with the periphery of the bore whereby the shank of a tool is adapted for operative mounting in said bore and on said supporting surface, and means for securing the shank of a tool in the said bore, the tool holder being adapted for selective mounting of a tool shank in the said recess or in the said bore.

3. A tool holder adapted for mounting on the top of a compound rest of a lathe, comprising a head adapted to bear against the compound rest, means for mounting a tool on the head, a shouldered slot in the base of the head, and a clamping block an integral portion of which has parallel sides said shouldered slot and the usual shouldered transverse slot in the top of the compound rest for clamping the head on the compound rest.

4. A tool holder adapted for mounting on the top of a compound rest of a lathe, comprising a head adapted to bear against the compound rest, a shank projecting rearwardly from the head in spaced relation above the top of the compound rest, a shouldered post swiveled in the usual shouldered transverse slot in the top of the compound rest, said post having a bore adapted to receive the shank, a block straddling the post and mounted on the top of the compound rest so as to support the shank, and means for clamping the shank against said block and the post in said slot.

5. A tool holder adapted for mounting on the top of a compound rest of a lathe, comprising a head adapted to bear against the compound rest, a shouldered slot in the base of the head, a clamping block adapted to engage said shouldered slot and the usual shouldered transverse slot in the top of the compound rest for clamping the head on the compound rest, a shank projecting rearwardly from the head, a shouldered post swiveled in the shouldered transverse slot in the top of the compound rest, said post having a bore adapted to receive the shank, and means for clamping the shank in said bore and the post in said slot.

6. A tool holder adapted for mounting on the top of a compound rest of a lathe, comprising a head adapted to bear against the compound rest, a shank projecting rearwardly from the head, the head having a bore with its axis extending in the direction of the shank, the shank forming a supporting surface in alinement with the periphery of the bore whereby the shank of a tool is adapted for operative mounting in said bore and on said supporting surface, a shouldered post swiveled in the usual shouldered transverse slot in the top of the compound rest, said post having a bore adapted to receive the shank of the tool holder and the tool shank supported thereon, and means for clamping said shanks in the bore of the post and the post in said slot.

7. A tool holder including a head having a bore adapted for reception of the shank of a tool, means for clamping the head against a support, a bracket, the head forming a support for one end of the bracket, and means carried by the clamping means for supporting the other end of the bracket, the bracket forming a support for auxiliaries for the tool.

8. In combination, an integral rigid tool holder having a recess open at one side, a tool shank adapted for reception in the recess, a longitudinally extending groove in one of a pair of opposite walls of the recess which define its open side, said groove being of uniform width in the direction of its depth, the grooved wall of the recess comprising surfaces projecting laterally from the respective sides of the groove, a projection on the tool shank of uniform width in the direction of its projection from the tool shank and being adapted for sliding fit in the groove, the tool shank having surfaces extending laterally from the respective sides of the base of the projection for engagement with the laterally extending surfaces of the grooved wall of the recess, the projection being so positioned transversely of the tool shank that irrespective of the width of the shank the projection is adapted for reception in the groove with the inner surface of the shank clearing the inner wall of the recess and the width of the shank projecting laterally outwardly through the open side of the recess, and a set screw carried by the tool holder and extending into the other of said pair of opposite walls of the recess, the tool shank having a surface adapted for abutment by the set screw for clamping the tool shank against the grooved wall of the recess.

9. In combination, an integral rigid tool holder having a recess open at one side, a tool shank adapted for reception in the recess, a longitudinally extending groove in one of a pair of opposite walls of the recess which define its open side, said groove being of uniform width in the direction of its depth, a projection on the tool shank of uniform width in the direction of its projection from the tool shank and being adapted for sliding fit in the groove, the projection being so positioned transversely of the tool shank that irrespective of the width of the shank the projection is adapted for reception in the groove with the inner surface of the shank clearing the inner wall of the recess and the width of the shank projecting laterally outwardly through the open side of the recess, and a set screw carried by the tool holder and extending into the other of said pair of opposite walls of the recess, the tool shank having a surface adapted for abutment by the set screw for clamping the tool shank against the grooved wall of the recess.

10. In combination, an integral rigid tool holder having a recess open at one side, a tool shank adapted for reception in the recess, a longitudinally extending groove in each of a pair of opposite walls of the recess which define its open side, said grooves being of uniform width in the direction of their depth, the grooved walls of the recess comprising surfaces projecting laterally from the respective sides of the grooves, a projection on each of a pair of opposite sides of the tool shank, said projections being of uniform width in the direction of their projection from the tool shank and being adapted for sliding fit in the grooves, the tool shank having surfaces extending laterally from the respective sides of the bases of the projections for engagement with the laterally extending surfaces of the grooved walls of the recess, the projections being so positioned transversely of the width of the tool shank that irrespective of the width of the shank the projections are adapted for reception in the grooves with the inner surface of the shank clearing the inner wall of the recess and the width of the shank projecting laterally outwardly through the open side of the recess, and a set screw carried by the tool holder and extending into one of the grooves, the shank projection which is received in said groove having a surface adapted for abutment by the set screw for clamping the tool shank against the opposite grooved wall of the recess.

11. In combination, an integral rigid tool holder having a recess open at one side, a tool shank adapted for reception in the recess, a longitudinally extending groove in each of a pair of opposite walls of the recess which define its open side, said grooves being of uniform width in the direction of their depth, a projection on each of a pair of opposite sides of the tool shank, said projections being of uniform width in the direction of their projection from the tool shank and being adapted for sliding fit in the grooves, the projections being so positioned transversely of the width of the tool shank that irrespective of the width of the shank the projections are adapted for reception in the grooves with the inner surface of the shank clearing the inner wall of the recess and the width of the shank projecting laterally outwardly through the open side of the recess, and a set screw carried by the tool holder and extending into one of the grooves, the shank projection which is received in said groove having a surface adapted for abutment by the set screw for clamping the tool shank against the opposite grooved wall of the recess.

JOHN M. PALMER.

CERTIFICATE OF CORRECTION.

Patent No. 1,945,292.  January 30, 1934.

JOHN M. PALMER.

It is hereby certified that error appears in the printed specification of the above numbered patent requiring correction as follows: Page 4, line 15, claim 3, after "sides" insert adapted for non-rotatable slidable engagement in both; and that the said Letters Patent should be read with this correction therein that the same may conform to the record of the case in the Patent Office.

Signed and sealed this 19th day of June, A. D. 1934.

Bryan M. Battey (Seal)  Acting Commissioner of Patents.